United States Patent [19]

Murakami et al.

[11] Patent Number: 4,962,981
[45] Date of Patent: Oct. 16, 1990

[54] OPTICAL SCANNER

[75] Inventors: Kazunori Murakami; Yasuo Matsumoto; Tomonori Ikumi, all of Shizuoka; Shoichi Sato, Tokyo, all of Japan

[73] Assignee: Tokyo Electric Company, Ltd., Tokyo, Japan

[21] Appl. No.: 377,951

[22] Filed: Jul. 11, 1989

[30] Foreign Application Priority Data

Aug. 30, 1988 [JP] Japan ................................ 63-216074
Aug. 31, 1988 [JP] Japan ................................ 63-216993

[51] Int. Cl.$^5$ ............................................ G02B 26/10
[52] U.S. Cl. ...................................... 350/6.7; 350/6.8; 355/84; 358/296; 358/481; 250/235; 250/208.2
[58] Field of Search .................. 350/6.7, 6.8; 250/208.2, 234, 235, 236, 363.02; 358/206, 209, 481, 296; 355/84

[56] References Cited

U.S. PATENT DOCUMENTS 4,205,350  5/1980  Gunning ........................ 350/6.7
4,329,012  5/1982  Minoura et al. ................ 350/6.8

FOREIGN PATENT DOCUMENTS 133009  10/1980  Japan .

Primary Examiner—Bruce Y. Arnold
Assistant Examiner—Loha Ben
Attorney, Agent, or Firm—Oblon, Spivak, McClelland, Maier & Neustadt

[57] ABSTRACT

An optical scanner for a laser printer or the like, capable of forming dots on scanning lines which are apparently the same in length. When the respective scanning speeds of spots of laser beams reflected respectively by a plurality of reflecting surfaces of a polygonal rotating mirror are different from each other, correction clock pulses are inserted in a print control clock signal for each scanning line.

7 Claims, 9 Drawing Sheets

OPTICAL SCANNER

FIELD OF THE INVENTION AND RELATED ART STATEMENT

The present invention relates to an optical scanner of a dot matrix system for printing.

A conventional optical scanner will be described with reference to FIGS. 6, 7 and 8. An optical scanner 1 for laser printer and the like has an illuminating optical system 5 comprising a laser diode 2, a cylindrical lens $3_1$, a focusing lens $3_2$ and a reflecting mirror 4. A v polygonal rotating mirror 6 having reflecting surfaces $7_1$ to $7_6$ is disposed with its center on the optical axis of the illuminating optical system 5 and is attached directly to the output shaft of a scanning motor, not shown. The laser diode 2 is connected to a print data circuit, not shown, which operates in synchronism with a print clock signal B, which will be described afterward. A correcting lens 8 is disposed with its optical axis in alignment with the optical axis of the illuminating optical system 5 so as to cover an angular range swept by laser beams reflected by the reflecting surfaces $7_1$ to $7_6$ of the polygonal rotating mirror 6. A photoconductive drum 9 is disposed behind the correcting lens 8 with its axis perpendicular to the optical axis of the illuminating optical system 5. A scanning start detecting unit 12 consisting of a reflecting mirror 10 and a start sensor 11 is disposed on a scanning start line from which a laser beam reflected by the polygonal rotating mirror 6 starts scanning the surface of the photoconductive drum 9. The optical scanner 1 has a reference clock, not shown, such as a quartz crystal oscillator, which generates a reference clock signal A (FIG. 8), and a print clock, not shown, which generates a print clock signal B (FIG. 8) obtained by dividing the frequency of the reference clock signal for the timing of printing dots.

The print clock signal B has, for example, one pulse for every eight pulses of the reference clock signal A. Therefore, one dot 14 of an image 13 is formed every eight pulses of the reference clock signal A. The illuminating optical system 5 emits a laser beam representing image information in synchronism with the print clock signal B. The laser beam is reflected by the polygonal rotating mirror 6 and the reflected laser beam is focused in a spot on the photoconductive drum 9 by the focusing lens $3_2$ and the correcting lens 8. Since the photoconductive drum 9 is rotating, the spot of the scanning laser beam moves in the direction of feed relative to the photoconductive drum 9. Thus, the latent image of the image 13 is formed in a dot matrix on the photoconductive drum 9, and then the the latent image is developed and transferred to a recording sheet by an electrophotographic process or the like to print the image 13. This conventional optical scanner 1 does not perform any control operation to synchronize the scanning operation for the image 13 and the rotation of the polygonal rotating mirror 6. Accordingly, the print clock signal B for each scanning cycle is started on the basis of synchronization of the reference clock signal A and start signals $S_1$, $S_2$, ... generated by the start sensor 11 upon the detection of a scanning laser beam by the scanning start detecting unit 12 to arrange the dots 14 of the image 13 accurately. Therefore, as shown in FIG. 8, the dot 14 corresponding to the scanning start position is dislocated by a distance corresponding to one pulse of the reference clock signal A due to a small lag in the start signals $S_1$ and $S_2$. The dislocation of the dot 14 from the scanning start position can be diminished by using a print clock signal B obtained by dividing the frequency of the reference clock signal A by a further greater number. However, such diminution of the dislocation of the dot 14 is limited because the synchronization of the reference clock signal A and the start signal S must be detected. However, the distance of dislocation of the dot is on the order of one-eighth the size of the dot, and hence such dislocation of the dot is not a significant problem in the ordinary image forming operation. The frequency dividing ratio is determined so that the dislocation of the dot is within an allowable range; for example, when a dislocation of about a quarter of the size of the dot is allowed, the frequency dividing ratio may be $\frac{1}{4}$.

This optical scanner 1 is able to operate silently at a high speed for printing. The polygonal rotating mirror 6 for deflecting the laser beam inevitably has errors in the position of the axis of rotation and in angular disposition of the reflecting surfaces $7_1$ to $7_6$. Accordingly, although dots 14 of the image 13 on a column $13_1$ corresponding to the scanning start position are aligned substantially exactly as shown in FIG. 7, the arrangement of dots 14 on a column $13_2$ corresponding to a scanning end position varies periodically. The deviation of the dot 14 from a correct position is proportional to the length of the scanning line and, in some cases, the deviation is as large as a value corresponding to two to six pulses of the reference clock signal A. Such a deviation is attributable to dimensional errors in the polygonal rotating mirror 6 and the scanning motor. When the polygonal rotating mirror 6 has six reflecting surfaces $7_1$ to $7_6$, the position of the dots 14 varies periodically within six scanning lines. Consequently, the image is printed in a low print quality.

To solve such a problem, a scanning beam control clock correcting apparatus is proposed in Japanese Patent Laid-open No. 55-133009. A conventional optical scanner incorporating this scanning beam control clock correcting device will be described hereinafter with reference to FIGS. 9, 10 and 11, in which parts like or corresponding to those previously described with reference to FIG. 6 are denoted by the same reference characters and the description thereof will be omitted.

A conventional optical scanner includes a scanning end detecting unit 16 disposed at a position corresponding to a scanning end position, a scanning start detecting unit 12 and a scanning beam control clock correcting unit 17 associated with the illuminating optical system.

Referring to FIG. 9, the scanning start detecting unit 12, the scanning end detecting unit 16 and a reference clock generator 18 are connected through a clock gate 19 and a first counter 20 to a memory 21. The scanning start detecting unit 12 is connected also through a second counter 22 for counting the number of scanning cycles to the memory 21. The memory 21 is connected through a ROM 23 to a variable frequency divider 24 and an up-down counter 25. The up-down counter 25 is connected through a data selector 27 to a delay circuit 26 which is connected to the clock gate 19.

The first counter 20 counts scanning time on the basis of the outputs of the scanning start detecting unit 12 and the scanning end detecting unit 16. The memory 21 stores values of scanning time for the reflecting surfaces $7_1$ to $7_6$ determined by the first counter 20 and specified by the output signal of the second counter 22. In the subsequent scanning cycle, the ROM 23 gives actuation pulses to the variable frequency divider 24 by using the values of scanning time as addresses, and scanning time correction signals are given to the up-down counter 25. The delay circuit 26 produces pulse streams as shown in FIG. 10 having clock phases $\phi_1$ to $\phi_7$ sequentially differing from each other by a time $\Delta t$ (sec) corresponding to the pulse width of the reference clock signal generated by the reference clock generator 18, and the data selector 27 selects a desired pulse signal among the pulse streams respectively of phases $\phi_0$ to $\phi_7$ as a corrected print control clock signal C according to the contents of the up-down counter 25. The variable frequency divider 24 counts the corrected print control clock signal C. Then, the up-down counter 25 is counted according to the count of the corrected print control clock signal C counted by the variable frequency divider 24. As the count increases, the up-down counter 25 sequentially changes the pulse streams $\phi_0$ to $\phi_7$ provided by the data selector 27. The pulse streams of phases $\phi_0$ to $\phi_7$ are the same in frequency as the reference clock signal A and the phases thereof are shifted relative to each other.

Gaps 29 are formed periodically in a predetermined scanning line as shown in FIG. 11 in an image 28 printed by the conventional optical scanner having the scanning beam control clock correcting unit 17, and dots on a column $30_2$ corresponding to the scanning end position are aligned satisfactorily as well as those on a column $30_1$ corresponding to the scanning start position. The size of the gap 29 corresponds, for example, to one pulse of the reference clock signal A, which is one-eighth the size of the dot in this example.

The the image 28 printed by the conventional optical scanner employing the scanning beam control clock correcting unit 17 is satisfactory with the dots 14 in exact alignment on the column $30_2$ corresponding to the scanning end position. However, the control unit of the conventional optical scanner comprises many circuit elements, such as the data selector 27, the counters 20 and 22 and the memory 21, to detect the mode of scanning and to repeat the correcting operation during the operation of the conventional optical scanner. Consequently, the conventional optical scanner is expensive and is not suitable for mass production.

The foregoing disadvantages of the conventional optical scanner can be overcome by using a polygonal rotating mirror and a scanning motor which are manufactured at an extremely high accuracy so that the respective scanning speeds of scanning beams reflected respectively by the reflecting surfaces $7_1$ to $7_6$ of the polygonal rotating mirror coincide exactly with each other. However, manufacturing the components of the optical scanner including the polygonal rotating mirror and the scanning motor at a higher accuracy is very difficult, increases the manufacturing cost of the optical scanner and hence is unpractical.

OBJECTS AND SUMMARY OF THE INVENTION

It is a first object of the present invention to enable printing in a high print quality without requiring particularly high accuracy in the polygonal rotating mirror and the scanning motor.

It is a second object of the present invention to enable scanning spots to scan scanning lines of the same length without requiring any complicated control means for varying the print clock signal during scanning operation.

It is a third object of the present invention to print an image in an apparently uniform dot density with respect to the scanning direction.

It is a fourth object of the present invention to print an image without causing moiré to occur in the printed image.

Other objects of the present invention will become apparent from the following description.

The present invention provides an optical scanner, which prints an image on the basis of image information given thereto in synchronism with a print control clock signal of a frequency equal to the submultiple of the frequency of a reference clock signal, comprising: scanning time measuring means for measuring the scanning time of a laser beam reflected by each reflecting surface of a polygonal rotating mirror by a scanning start detecting unit disposed at the scanning start position of a scanning range and a scanning end detecting unit disposed at the scanning end position of the scanning range; correction pulse calculating means for calculating the number of pulses of the reference clock signal necessary for scanning a scanning line of a fixed length on the basis of the measured scanning time of the laser beam reflected by each reflecting surface of the polygonal rotating mirror, and calculating the difference between the number of pulses of the reference clock signal corresponding to the scanning time of the laser beam reflected by one of the reflecting surface of the polygonal rotating mirror and the number of pulses of the reference clock signal corresponding to the scanning time of the laser beam reflected by another reflecting surface of the polygonal rotating mirror; and scanning line matching means for uniformly distributing correction pulses calculated by the correction pulse calculating means in print control clock signals for the reflecting surfaces of the polygonal rotating mirror.

Thus, the optical scanner of the present invention scans scanning lines of the same length without using any complicated control means for varying the print control clock signal during the scanning operation, so that an image can be clearly printed in a high print quality, the scanning motor and the polygonal rotating mirror need not be fabricated at an extremely high accuracy, and the optical scanner can be manufactured at a reduced cost.

DETAILED DESCRIPTION OF THE PREFERRED EMBODIMENTS

Figure 1:
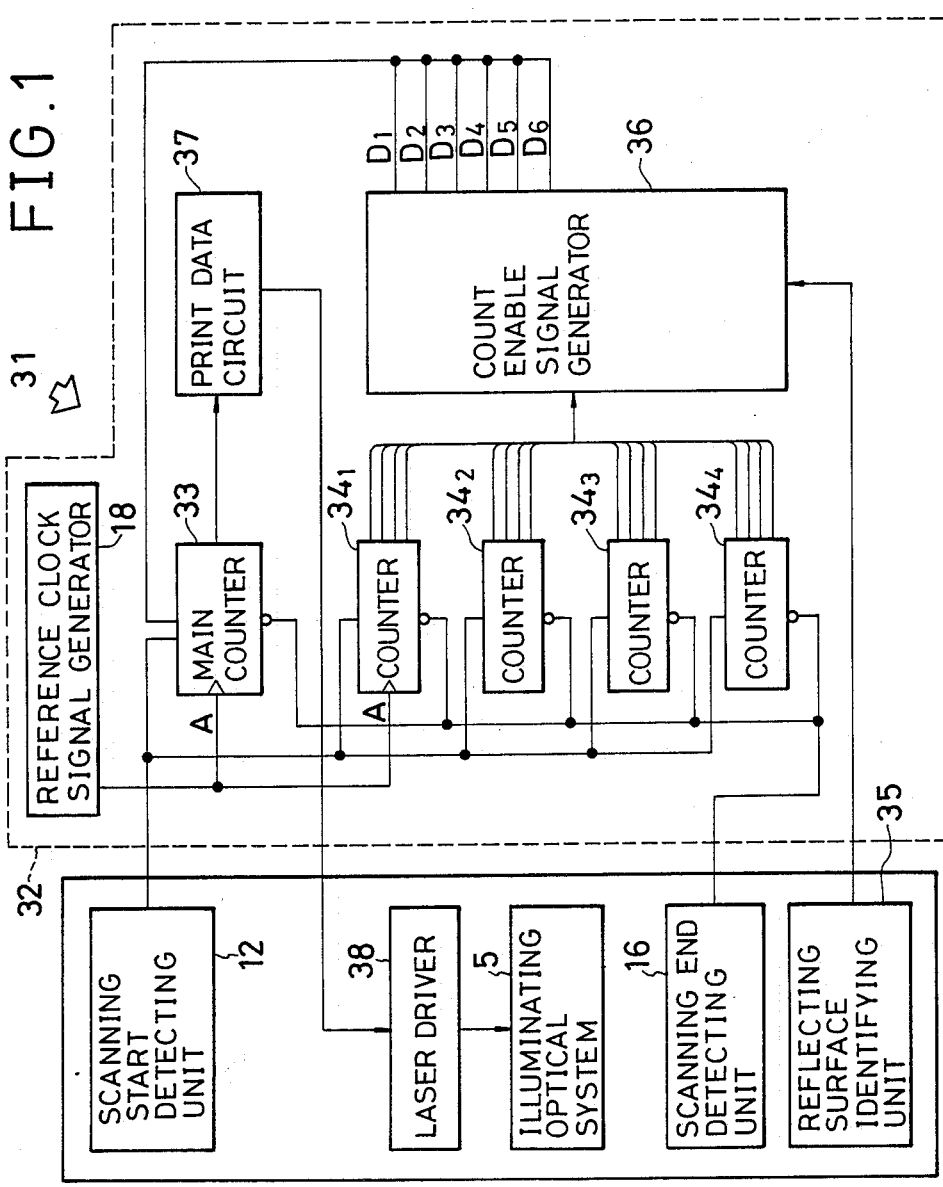
FIG. 1 is a circuit diagram of an optical scanner in a first embodiment according to the present invention.
Figure 2:
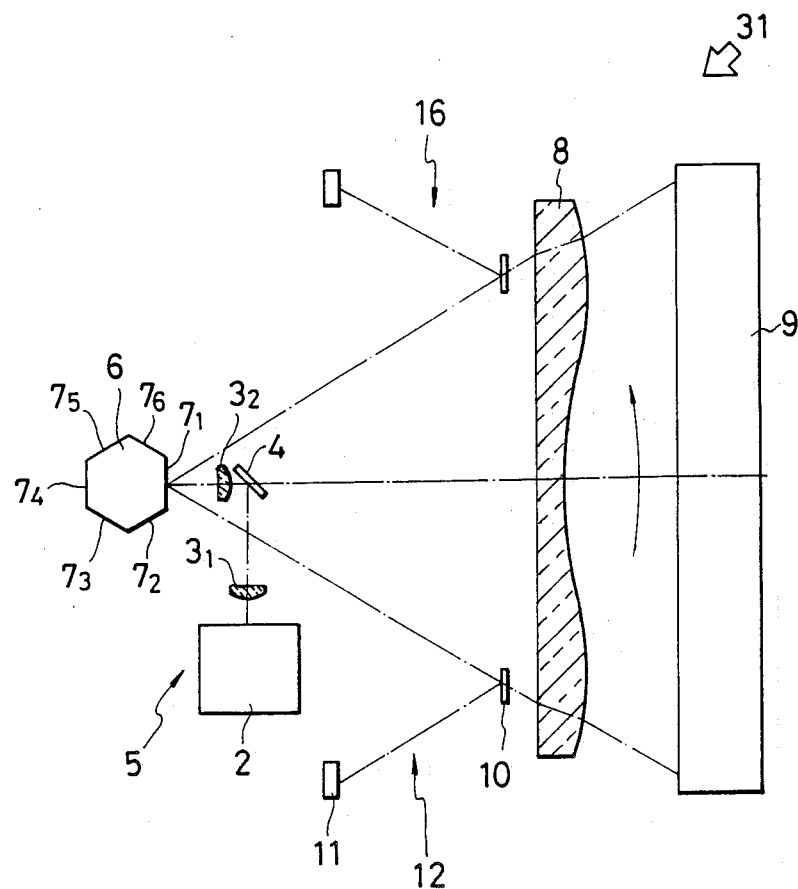
FIG. 2 is a schematic plan view showing the optical arrangement of the optical scanner of FIG. 1.

First Embodiment (FIGS. 1, 2)

An optical scanner 31 in a first embodiment according to the present invention is similar in composition to the foregoing conventional optical scanner including the scanning end detecting unit 16. First, an image information output unit 32 included in the optical scanner 31 will be described with reference to FIG. 1. A scanning start detecting unit 12, a scanning end detecting unit 16 and a reference clock generator 18 are connected to a main counter 33 serving as a frequency divider as well as a counter, and four digital counters $34_1$ to $34_4$ capable of counting four place numbers and serving as scanning time measuring means. The counters $34_1$ to $34_4$ and a reflecting surface identifying unit 35 for identifying the reflecting surfaces of a polygonal rotating mirror 6 are connected to a count enable signal generator 36 serving as correction clock calculating means and scanning line matching means. The count enable signal generator 36 registers a calculated count enable signal, i.e., a correction clock signal for increasing or decreasing the number of pulses of a print control clock signal B. The count enable signal generator 36 is connected through the main counter 33 to a print data circuit 37, which in turn is connected through a laser driver 38 to a laser diode 2 included in an illuminating optical system 5.

The operation of the optical scanner 31 for setting a corrected print control clock D.

When the size of a recording sheet is A4 (JIS: Japanese Industrial Standards) and dot density is 300 dots/in., the optical scanner 31 forms a scanning line by about 2600 dots. Suppose that the optical scanner 31 prints one dot every eight pulses of a reference clock signal A. Then, the number of pulses included in the reference clock signal A for one scanning line is 20,800. Since the digital counters $34_1$ to $34_4$ are capable of counting four place number, 65,536 pulses ($16^4$ pulses) can be counted. The reflecting surfaces $7_1$ to $7_6$ of the polygonal rotating mirror 6 are identified by detection signals provided by the reflecting surface identifying unit 35. The counters $34_1$ to $34_4$ count the number of pulses of the reference clock signal A corresponding to the time difference between the detection signals provided respectively by the scanning start detecting unit 12 and the scanning end detecting unit 16 to measure the values of scanning time for the reflecting surfaces $7_1$ to $7_6$ are measured. It may be considered that the values of scanning time for the reflecting surfaces $7_1$ to $7_6$ are proportional respectively to the lengths of scanning lines swept by the spots of laser beams reflected respectively by the reflecting surfaces $7_1$ to $7_6$. Therefore, the operator selects one of the measured values of scanning time as a reference scanning time. For example, in adjusting a shorter scanning line to the longest scanning line, the difference between the number of pulses of the reference clock signal A for the longest scanning line and that for the shorter scanning line is calculated; and then a predetermined number of count enable signals are inserted in the print control clock signal B for the reflecting surface 7, which reflected the laser beam for the shorter scanning line, to produce a corrected print control clock signal D. The printing operation is started after the corrected print control clock signals D respectively for the reflecting surfaces $7_1$ to $7_6$ have been set.

The printing operation of the optical scanner will be described hereinafter. Upon the incidence of a laser beam emitted by the illuminating optical system 5 and reflected by the polygonal rotating mirror 6 on the scanning start detecting unit 12, the scanning start detecting unit 12 provides a scanning start signal S to start an image scanning operation. The reflecting surface identifying unit 35 provides identification signals for identifying the reflecting surfaces $7_1$ to $7_6$. Upon the start of the image scanning operation, the counters $34_1$ to $34_4$ start counting the pulses of the reference clock signal A, and then count enable signals respectively for the reflecting surfaces $7_1$ to $7_6$ are generated. Each count enable signal corresponds one pulse of the reference clock signal A and a dot of a width greater than that of a predetermined dot 14 by one-eighth the width of the latter. That is, the size of the dot in the feed direction remains unchanged while the size of the dot in the scanning direction corresponds to nine pulses of the reference clock signal A, so that an elliptic dot having a major axis extending in the scanning direction is formed. To reduce the length of the scanning line, a narrower dot having a width corresponding to seven pulses of the reference clock signal A is formed. At the end of one scanning cycle, the laser beam falls on the scanning end detecting unit 16. Then, the scanning end detecting unit 16 provides a signal to clear the counters $34_1$ to $34_4$ to prepare for the next scanning cycle by the next reflecting surface 7. Thus, the latent image of the image 13 is formed in a dot matrix on the photoconductive drum 9, and then the latent image is developed and transferred to a recording sheet by an electrophotographic process to print the image 13. The count enable signal is registered once in assembling the optical scanner 31 and need not be changed during the operation of the optical scanner 31.

Although the optical scanner 31 has been described as an optical scanner which provides a corrected print control clock signal D for a shorter scanning line to adjust the shorter scanning line to the longest scanning line, a longer scanning line may be adjusted to the shortest scanning line. In the latter case, a signal to reduce the pulses of the print control clock signal B by a predetermined number of pulses is used.

Figure 3:
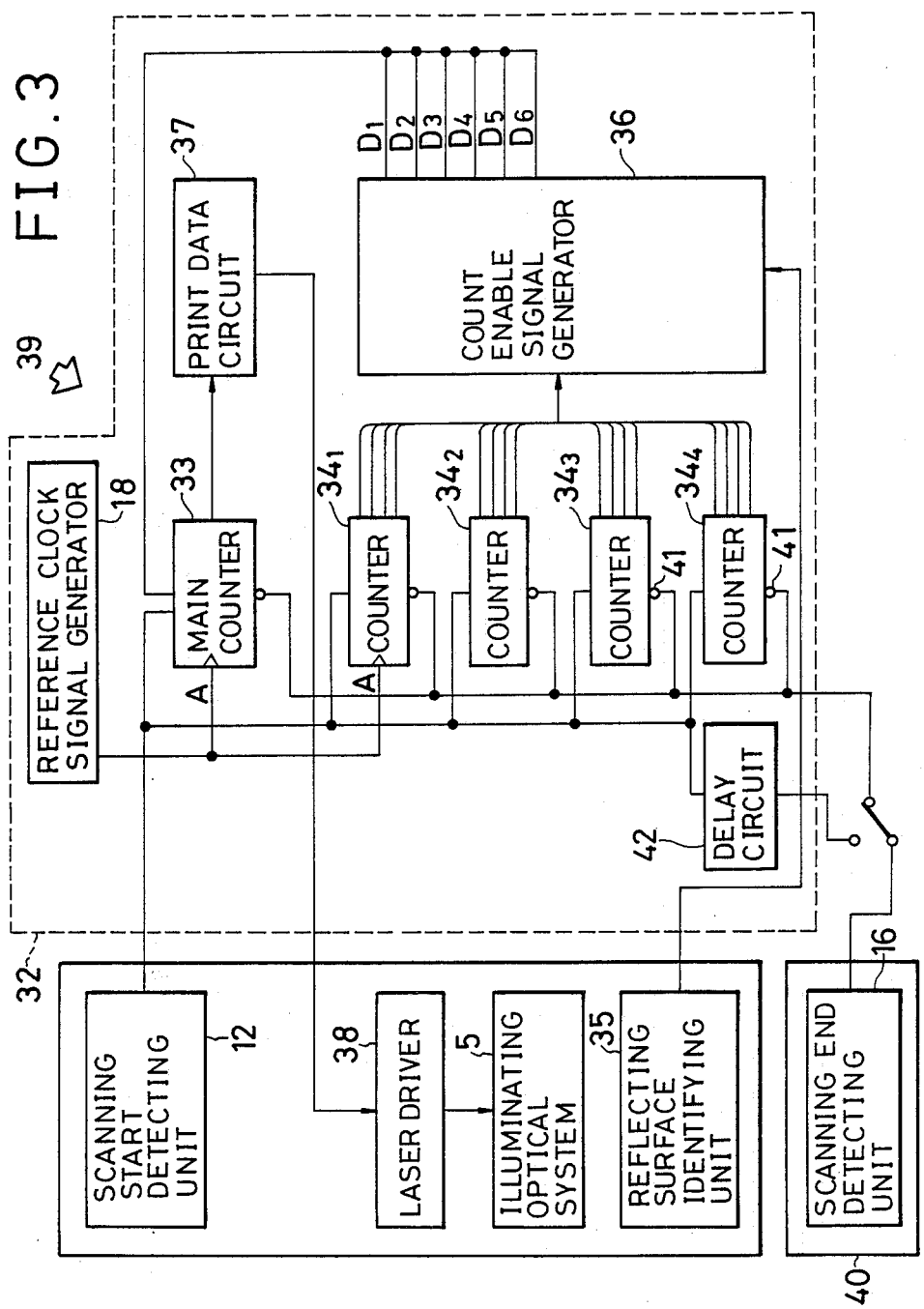
FIG. 3 is a circuit diagram of an optical scanner in a second embodiment according to the present invention.

Second Embodiment (FIG. 3)

In FIG. 3, parts like or corresponding to those previously described with reference to FIG. 1 are denoted by the same reference characters and the description thereof will be omitted.

An optical scanner 39 in a second embodiment according to the present invention has a scanning end detecting unit 16 mounted on a jig 40 for assembling the optical scanner 39. The clear signal input terminals 41 of counters $34_1$ to $34_4$ connected to the scanning end detecting unit 16 can be connected through a delay circuit 42 to a scanning start detecting unit 12.

In assembling the optical scanner 39, a corrected print control clock signal D is determined and registered. Thus, the optical scanner 39 functions in the same operating mode as that of the optical scanner 31. After registering the corrected print control clock signal D, the scanning end detecting unit 16 is removed together with the jig 40 from the optical scanner 39 for use in assembling and adjusting another optical scanner 39, and the clear signal input terminals 41 of the counters $34_1$ to $34_4$ are connected through the delay circuit 42 to the scanning start detecting unit 12. In operation, the optical scanner 39 starts the image scanning operation upon the detection of a laser beam by the scanning start detecting unit 12. At a moment where the scanning is completed, the output signal of the scanning start detecting unit 12 is applied through the delay circuit 42 to the clear signal input terminals of the counters $34_1$ to $34_4$ to clear the counters $34_1$ to $34_4$.

Since the scanning end detecting unit 16 mounted on the jig 40 is used for adjusting a plurality of optical scanners 39, the manufacturing cost of the optical scanners 39 is reduced, the appropriateness of the optical scanner 39 to mass production is enhanced, and the optical scanner 39 can be formed in a reduced size.

Figure 4:
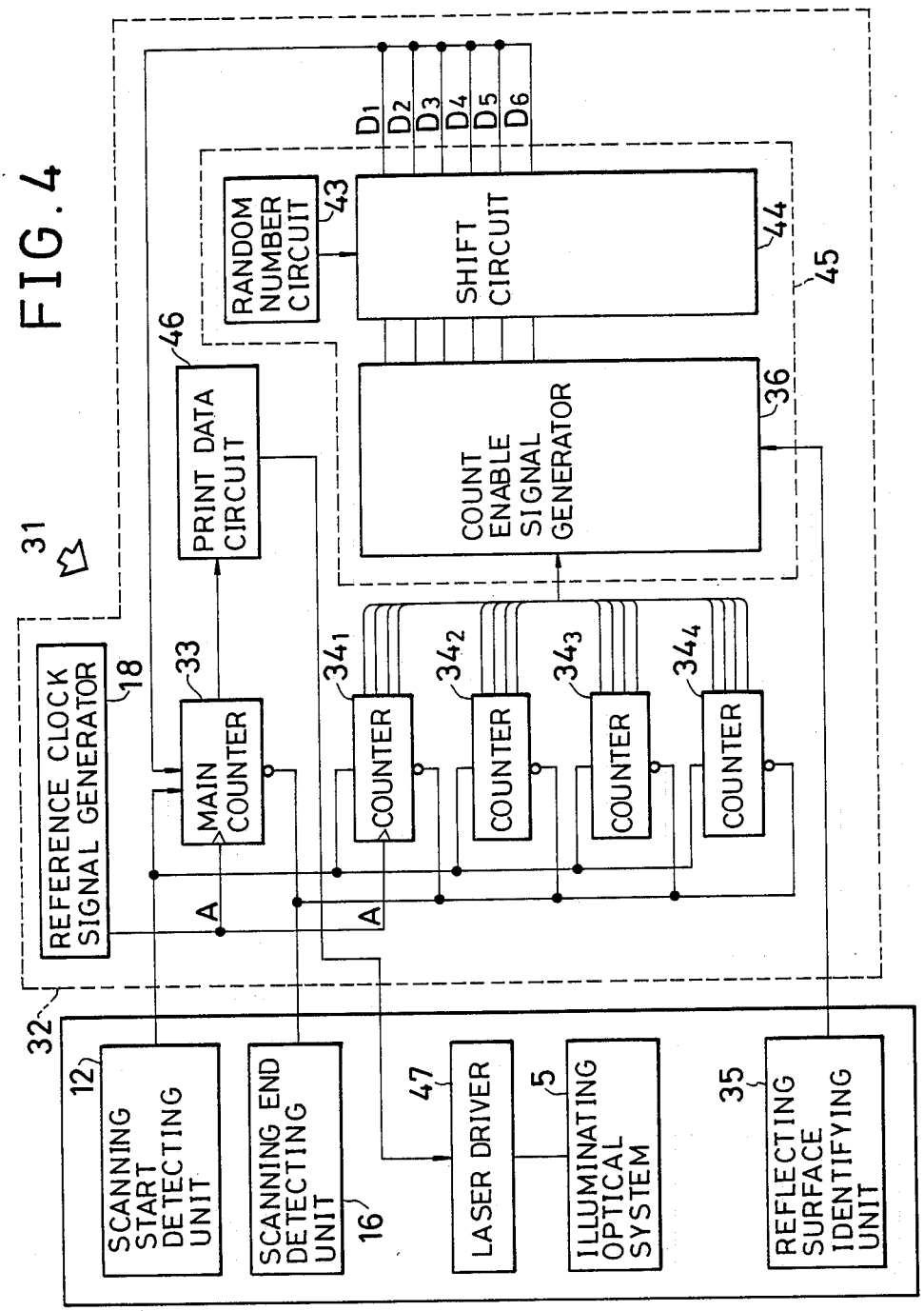
FIG. 4 is a circuit diagram of an optical scanner in a third embodiment according to the present invention.

Third Embodiment (FIG. 4)

In FIG. 4, parts like or corresponding to those previously described with reference to FIG. 1 are denoted by the same reference characters and the description thereof will be omitted.

An optical scanner 31 in a third embodiment according to the present invention has a scanning start detecting unit 12, a scanning end detecting unit 16 and a reference clock signal generator 18 are connected to a main counter 33 serving also as a frequency divider, and four digital counters $34_1$ to $34_4$ capable of counting four place numbers and serving as scanning time measuring means included in an image information output unit 32. The counters $34_1$ to $34_4$ and a reflecting surface identifying unit 35 which provides signals for identifying the reflecting surfaces of a polygonal rotating mirror 6 are connected to an count enable signal generator 36, which calculates a count enable signal, i.e., a corrected clock signal for increasing or decreasing the number of pulses of a print control clock signal B, and registers the calculated count enable signal. The count enable signal generator 36 is connected through a shift circuit 44 connected to a random number generating circuit 43 to the main counter 33. The count enable signal generator 36, the random number generating circuit 43 and the shift circuit 44 comprise a scanning length matching unit 45. The main counter 33 is connected through a print data circuit 46 to a laser driver 47 for controlling an illuminating optical system 5.

The operation of the optical scanner 31 for setting a corrected print control clock signal D will be described hereinafter. Suppose that the optical scanner 31 prints an image on a recording sheet of a size A4 in a dot density of 300 dots/in., and the optical scanner 31, similarly to the optical scanner 1, prints one dot every eight pulses of the reference clock signal A. Then, one scanning line corresponds to about 2600 dots, which corresponds to 20,800 pulses of the reference clock signal A. The counters $34_1$ to $34_4$ capable of counting four place numbers is able to count 65,536 pulses ($16^4$ pulses). The reflecting surfaces $7_1$ to $7_6$ are identified by detection signals provided by the reflecting surface identifying unit 35. The counters $34_1$ to $34_4$ count the pulses of the reference clock signal A corresponding to values of scanning time proportional respectively to the lengths of scanning lines swept by laser beams reflected respectively by the reflecting surfaces $7_1$ to $7_6$. The optical scanner adjusts shorter scanning lines to the longest scanning line. For example, at the start of the scanning operation, the optical scanner 31 calculates the difference between the number of pulses of the reference clock signal A for the longest scanning line and that of pulses of the reference clock signal A for each shorter scanning line, and the count enable signal generator 36 inserts a predetermined number of count enable signals corresponding to the calculated result in a print control clock signal B for the reflecting surface 7 reflected a laser beam for the shorter scanning line. The random number circuit 43 and the shift circuit 44 regulate the timing of inserting the count enable signals so that the count enable signals are inserted at random to provide corrected print control clock signals $D_1$ to $D_6$ respectively for the reflecting surfaces $7_1$ to $7_6$. The corrected print control clock signals $D_1$ to $D_6$ are registered, and then the optical scanner 31 is ready to perform the printing operation.

The printing operation of the optical scanner will be described hereinafter. A laser beam emitted by the illuminating optical system 5 is reflected by the polygonal rotating mirror 6 and the reflected laser beam falls on the scanning start detecting unit 12. Then, the scanning start detecting unit 12 provides a scanning start signal S to start the image scanning operation. The scanning length matching unit 45 identifies the reflecting surface 7 which reflected the laser beam by the output signal of the reflecting surface identifying unit 35, and then the scanning length matching unit 45 gives a corrected print control clock signal D through the main counter 33 to the print data unit 46 in synchronism with the counting operation of the counters $34_1$ to $34_4$. A print timing shift included in the corrected print control clock signal D corresponds to one pulse of the reference clock signal A and the increment or decrement of the length of a dot 14 is on the order of one-eighth the length of the dot 14. At the end of the scanning line, the laser beam falls on the scanning end detecting unit 16 and, at the same time, the scanning end detecting unit 16 provides an output signal to clear the counters $34_1$ to $34_4$ for the subsequent scanning operation of the next reflecting surface of the polygonal rotating mirror 6. A latent image thus formed in a dot matrix on the photoconductive drum 9 is developed and a developed image is transferred to a recording sheet by an electrophotographic process.

Figure 11:
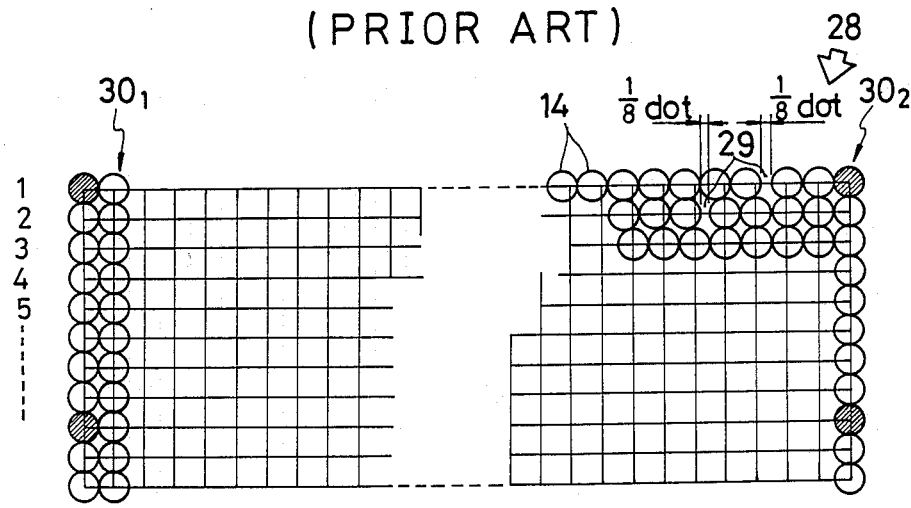
FIG. 11 is an illustration of a printed image of the scanner of FIG. 9.

Similarly to the image 28 shown in FIG. 11, the image printed by using the corrected print control clock signals D has dots exactly aligned on a column corresponding to the scanning end positions of the laser beams and gaps are formed at random between the dots, so that no moiré pattern is formed in the printed image.

Although the optical scanner 31 has been described as an optical scanner which provides a corrected print control signal D for a shorter scanning line to adjust the shorter scanning line to the longest scanning line, a longer scanning line may be adjusted to the shortest scanning line. In the latter case, a signal to reduce the pulses of the print control clock signal B by a predetermined number of pulses is used.

Figure 5:
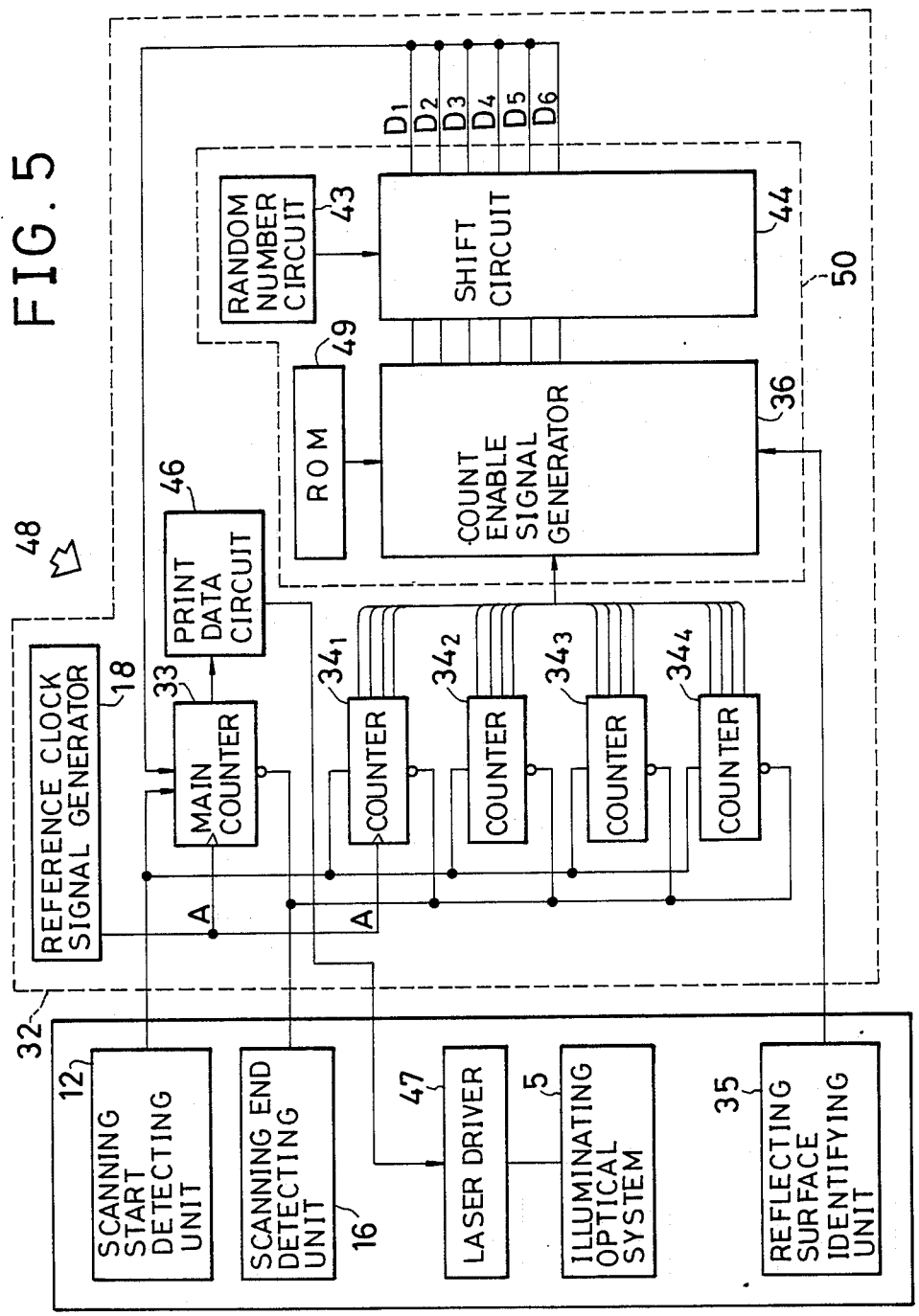
FIG. 5 is a circuit diagram of an optical scanner in a fourth embodiment according to the present invention.
Figure 6:
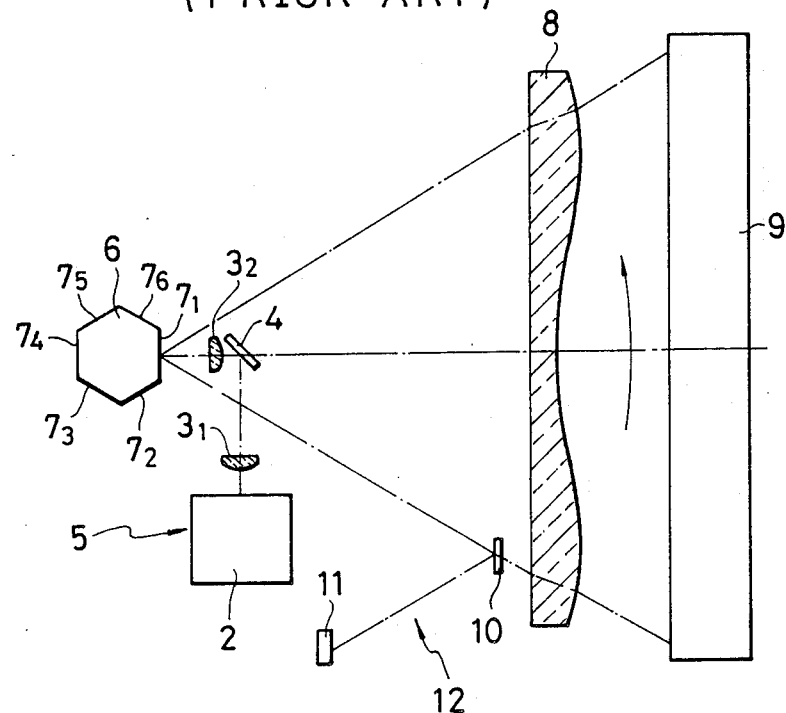
FIG. 6 is a schematic plan view showing the optical arrangement of a conventional optical scanner.
Figure 7:
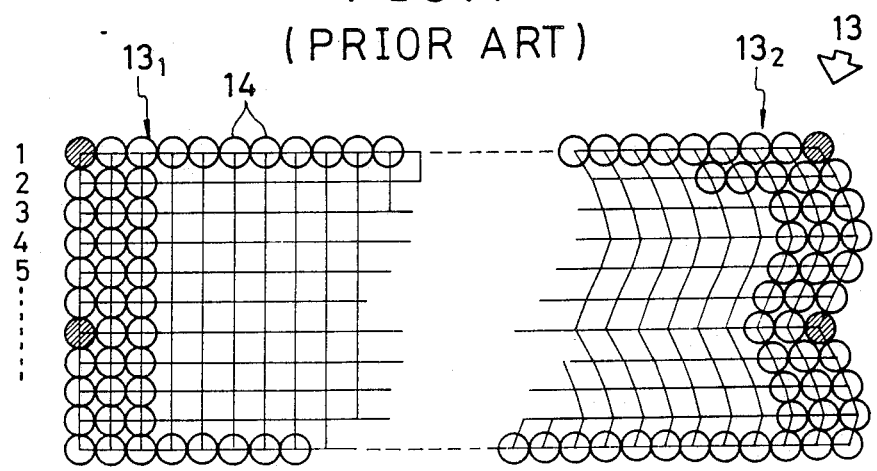
FIG. 7 is an illustration of a printed image obtained from the optical arrangement of FIG. 6.
Figure 8:
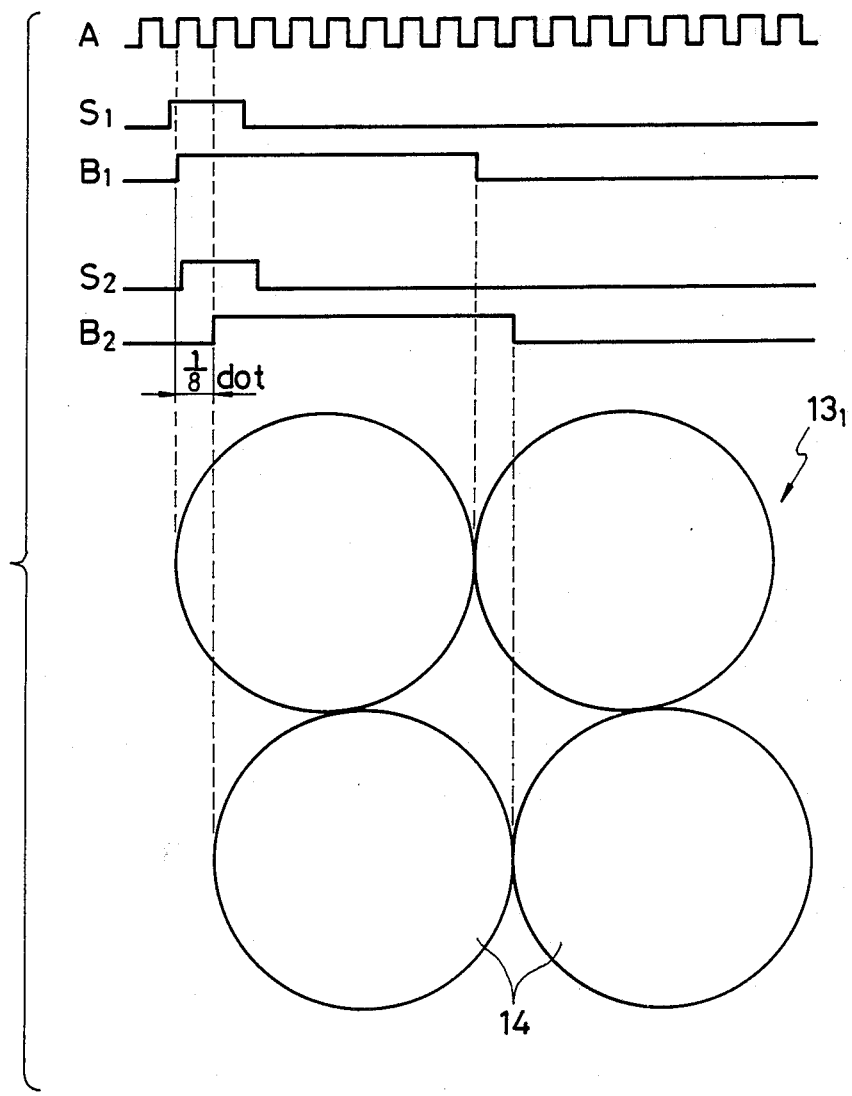
FIG. 8 is a time chart of assistance in explaining a manner of timing dot printing operation of the printed image of FIG. 7.
Figure 9:
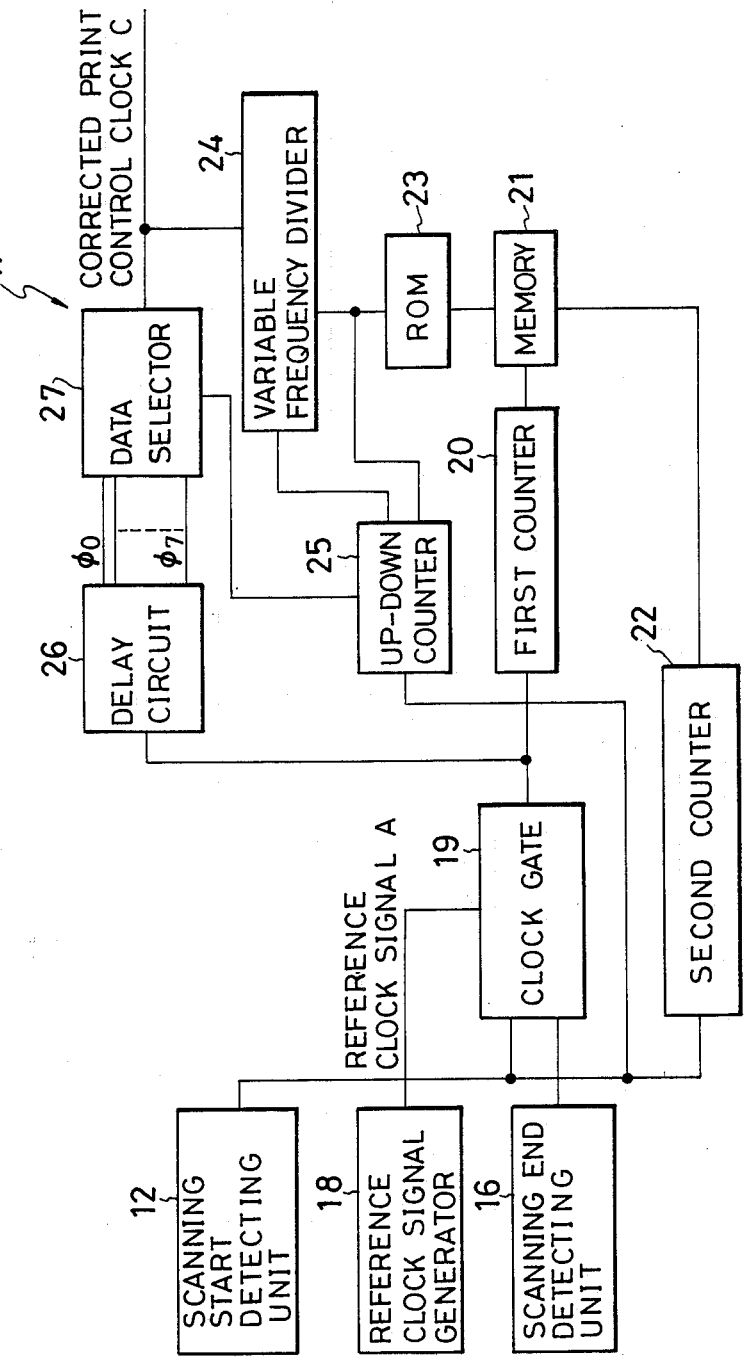
FIG. 9 is a block diagram of another conventional optical scanner.
Figure 10:
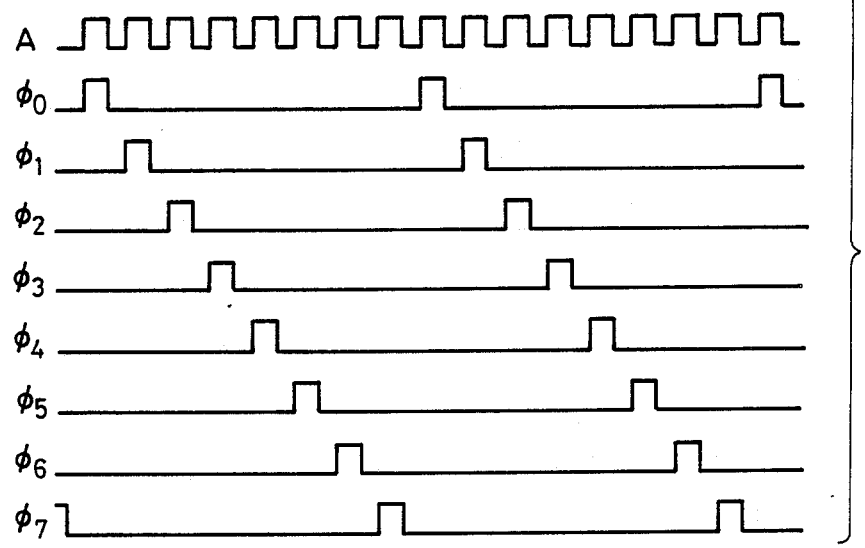
FIG. 10 is a diagram of assistance in explaining pulse streams produced by the scanner of FIG. 9.

Fourth Embodiment (FIG. 5)

An optical scanner 48 in a fourth embodiment according to the present invention is substantially the same in constitution as the optical scanner 31 in the third embodiment, except that a ROM 49 is connected to a count enable signal generator 36, and the ROM 49, the count enable signal generator 36, a random number circuit 43 and a shift circuit 44 comprise a scanning length matching unit 50 serving also as scanning speed correcting means. The ROM 49 stores a scanning speed correcting clock E for inserting dots of different lengths to make intervals between dots on the photoconductive drum 9 apparently uniform on the basis of the scanning speed of a spot formed by a laser beam on the photoconductive drum 9 measured beforehand.

Similarly to the optical scanner 31, the optical scanner 48 forms each scanning line by dots including those of different lengths distributed at random, so that an image is formed clearly. Furthermore, since dots are arranged in each scanning line at apparently uniform intervals, the dot density with respect to the scanning direction is uniform.

What is claimed is:

1. In an optical scanner comprising: a print data circuit which provides dot image information in synchronism with a print control clock signal having a frequency which is a submultiple of the frequency of a reference clock signal; an illuminating optical system connected to the print data circuit to emit laser beams representing the dot image information; a polygonal rotating mirror having a plurality of reflecting surfaces, disposed with its center of rotation on the optical axis of the illuminating optical system, and driven by driving means for rotation at a constant rotating speed; and a focusing optical system for focusing a laser beam reflected by the polygonal rotating mirror in a spot on a photoconductive body; the improvement comprising: scanning time measuring means for measuring a scanning time of a laser beam reflected by each reflecting surface of the polygonal rotating mirror by using a scanning start detecting unit disposed at a scanning start position of a scanning range to be swept by a laser beam and a scanning end detecting unit disposed at a scanning end position of the scanning range; correction clock pulse calculating means for calculating the number of reference clock pulses necessary for scanning a scanning line of a fixed length on the basis of each measured scanning time, and calculating the difference between the number of pulses of the reference clock signal corresponding to the scanning time of the laser beam reflected by each reflecting surface of the polygonal rotating mirror, and the number of pulses of the reference clock signal corresponding to the scanning time of the laser beam reflected by a specific reflecting surface among those of the polygonal rotating mirror; and scanning length matching means for distributing the pulses of a correction clock signal calculated by the correction clock pulse calculating means in a print control clock signal for each reflecting surface of the polygonal rotating mirror.

2. An optical scanner according to claim 1, wherein said scanning end detecting unit is a detachable component.

3. An optical scanner according to claim 1, wherein the size of a corrected dot for a part where the scanning speed is low is increased in the scanning direction.

4. An optical scanner according to claim 1, wherein the size of a corrected dot for a pat where the scanning speed is high is decreased in the scanning direction.

5. An optical scanner according to claim 1, wherein the correction clock pulses calculated by the correction clock pulse calculating means are distributed uniformly in a print control clock signal for each reflecting surface of the polygonal rotating mirror.

6. In an optical scanner comprising: a print data circuit which provides dot image information in synchronism with a print control clock signal having a frequency which is a submultiple of the frequency of a reference clock signal; an illuminating optical system connected to the print data circuit to emit laser beams representing the dot image information; a polygonal rotating mirror having a plurality of reflecting surfaces, disposed with its center of rotation on the optical axis of the illuminating optical system, and driven by driving means for rotation at a constant rotating speed; and a focusing optical system for focusing a laser beam reflected by the polygonal rotating mirror in a spot on a photoconductive body; the improvement comprising: scanning time measuring means for measuring a scanning time of a laser beam reflected by each reflecting surface of the polygonal rotating mirror by using a scanning start detecting unit disposed at a scanning start position of a scanning range to be swept by a laser beam and a scanning end detecting unit disposed at a scanning end position of the scanning range; correction clock pulse calculating means for calculating the number of reference clock pulses necessary for scanning a scanning line of a fixed length on the basis of each measured scanning time, and calculating the difference between the number of pulses of the reference clock signal corresponding to the scanning time of the laser beam reflected by each reflecting surface of the polygonal rotating mirror, and the number of pulses of the reference clock signal corresponding to the scanning time of the laser beam reflected by a specific reflecting surface among those of the polygonal rotating mirror; and scanning length matching means including a random number circuit for distributing the pulses of a correction clock signal calculated by the correction clock pulse calculating means at random in a print clock signal for each reflecting surface of the polygonal rotating mirror.

7. An optical scanner according to claim 6, further comprising scanning speed correcting means for inserting more speed correcting clock pulses in print control clock signals for each reflecting surface of the polygonal rotating mirror reflecting laser beams for scanning at higher scanning speeds to make uniform the scanning speed in each scanning cycle.

* * * * *